(12) United States Patent
Hassan et al.

(10) Patent No.: US 10,956,558 B2
(45) Date of Patent: Mar. 23, 2021

(54) METHODS FOR INCREASING AUTHENTICATION SECURITY

(71) Applicant: Microsoft Technology Licensing, LLC, Redmond, WA (US)

(72) Inventors: Amer A. Hassan, Kirkland, WA (US); Edward C. Giaimo, III, Bellevue, WA (US); Wei-Chen Chen, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 241 days.

(21) Appl. No.: 16/176,589

(22) Filed: Oct. 31, 2018

(65) Prior Publication Data
US 2020/0134166 A1   Apr. 30, 2020

(51) Int. Cl.
*G06F 21/00* (2013.01)
*G06F 21/45* (2013.01)
*H04L 29/06* (2006.01)

(52) U.S. Cl.
CPC ............ *G06F 21/45* (2013.01); *H04L 63/083* (2013.01)

(58) Field of Classification Search
CPC .............................. G06F 21/45; H04L 63/083
See application file for complete search history.

(56) References Cited

U.S. PATENT DOCUMENTS

| | | | |
|---|---|---|---|
| 6,151,593 A | 11/2000 | Cho et al. | |
| 7,305,559 B2 | 12/2007 | Schreiber et al. | |
| 7,444,517 B2 | 10/2008 | Dayan et al. | |
| 7,539,874 B2 | 5/2009 | Waterland | |
| 7,921,454 B2 | 4/2011 | Cerruti et al. | |
| 8,281,147 B2 | 10/2012 | Florencio et al. | |
| 8,549,314 B2 | 10/2013 | Mahmoud Abd Alla et al. | |
| 9,184,921 B2 | 11/2015 | Novak | |
| 9,237,150 B2 | 1/2016 | Yun et al. | |
| 9,407,632 B2 | 8/2016 | Agarwal | |
| 9,590,808 B2 | 3/2017 | Jiang et al. | |
| 9,626,506 B1 | 4/2017 | Shetty et al. | |
| 9,876,782 B2 | 1/2018 | Holtz | |
| 9,923,876 B2 | 3/2018 | Nahari | |

(Continued)

FOREIGN PATENT DOCUMENTS

| KR | 20080112651 A | 12/2008 |
|---|---|---|
| WO | 2017070600 A1 | 4/2017 |
| WO | 2018148103 A1 | 8/2018 |

OTHER PUBLICATIONS

"What is the Use of a Client Nonce?", Retrieved From: https://web.archive.org/web/20161221185840/http:/security.stackexchange.com:80/questions/3001/what-is-the-use-of-a-client-nonce, Retrieved Date: Dec. 21, 2016, 3 Pages.

(Continued)

*Primary Examiner* — Jeffrey C Pwu
*Assistant Examiner* — William A Corum, Jr.
(74) *Attorney, Agent, or Firm* — Schwegman Lundberg, & Woessner, P.A.

(57) ABSTRACT

Methods and systems for authenticating a user account based on a password are disclosed. In one aspect, a method includes receiving input defining a sequence of characters included in an entered password, ignoring characters between a first position in the sequence of characters and a second position in the sequence of characters, and validating the password based on non-ignored characters in the sequence of characters.

16 Claims, 10 Drawing Sheets

(56) References Cited

U.S. PATENT DOCUMENTS

| | | | | |
|---|---|---|---|---|
| 10,027,684 | B1* | 7/2018 | Paterson | H04L 63/08 |
| 2006/0242424 | A1 | 10/2006 | Kitchens et al. | |
| 2009/0144554 | A1* | 6/2009 | Baker | G06F 21/445 |
| | | | | 713/183 |
| 2011/0078788 | A1* | 3/2011 | Takimoto | G06F 21/83 |
| | | | | 726/19 |
| 2012/0222093 | A1 | 8/2012 | Badenes et al. | |
| 2012/0246483 | A1 | 9/2012 | Raisch | |
| 2013/0179408 | A1* | 7/2013 | Stoakes | G06F 16/1752 |
| | | | | 707/692 |
| 2014/0215601 | A1* | 7/2014 | Rittle | G06F 21/36 |
| | | | | 726/16 |
| 2014/0215681 | A1 | 8/2014 | Goodman | |
| 2015/0033305 | A1 | 1/2015 | Shear et al. | |
| 2015/0058941 | A1 | 2/2015 | Lyman et al. | |
| 2015/0349960 | A1 | 12/2015 | Bagley | |
| 2017/0163625 | A1 | 6/2017 | Brown | |
| 2017/0185806 | A1* | 6/2017 | Kong | G06F 21/45 |
| 2018/0224989 | A1* | 8/2018 | Deasy | G06F 1/1671 |
| 2018/0288026 | A1* | 10/2018 | Callaghan | G06F 21/31 |
| 2019/0080060 | A1* | 3/2019 | Lee | G06F 21/46 |

OTHER PUBLICATIONS

"Non Provisional Application Filed in U.S. Appl. No. 15/822,065", filed Nov. 24, 2017, 36 Pages.

"Non Provisional Application Filed in U.S. Appl. No. 15/909,956", filed Mar. 1, 2018, 40 Pages.

Atwood, Jeff, "You're Probably Storing Passwords Incorrectly", Retrieved Date: https://blog.codinghorror.com/youre-probably-storing-passwords-incorrectly/, Sep. 16, 2007, 30 Pages.

Guljari, et al., "Authentication of Users by Typing Pattern: A Review", In International Journal of Science Technology & Engineering, vol. 2, Issue 10, Apr. 2016, pp. 1010-1014.

Gupta, Lokesh, "Generate Secure Password Hash: MD5, SHA, PBKDF2, BCrypt Examples", Retrieved From: https://howtodoinjava.com/security/how-to-generate-secure-password-hash-md5-sha-pbkdf2-bcrypt-examples/, Jul. 22, 2013, 33 Pages.

Zhao, Ying, "Learning User Keystroke Patterns for Authentication", In International Journal of Computer, Electrical, Automation, Control and Information Engineering, vol. 2, Issue 2, Jan. 2008, pp. 456-461.

Aspinall, et al., "Give Me Letters 2, 3 and 6!: Partial Password Implementations and Attacks", In Proceedings of The International Conference on Financial Cryptography and Data Security, Apr. 1, 2013, 18 Pages.

"International Search Report and Written Opinion Issued in PCT Application No. PCT/US2019/057112", dated Dec. 10, 2019, 10 Pages.

"Client side hashing and encryption", Retrieved from: https://glynrob.com/javascript/client-side-hashing-and-encryption/, Oct. 20, 2013, 7 Pages.

* cited by examiner

METHODS FOR INCREASING AUTHENTICATION SECURITY

BACKGROUND

As computing as become increasing pervasive in both economic and personal life, the importance of securing computing information has become paramount. Headlines over the past several years have highlighted the dangers of weak computer security, which may lead to information theft, malicious computer use via the installation of malware, and other problems.

Many computer resources are protected via a combination of username and password. After authentication information matching a valid username and password for an account is provided, access to certain computer resources associated with a user account may be granted. If a nefarious actor were to obtain a valid username and password for a computer account, those computer resources are at risk of malicious use. One method used to obtain valid usernames and passwords is to observe a user typing this information in at their keyboard. Sophisticated malicious actors may even employ magnification devices such as binoculars or telescopes, coupled with video recording equipment, to enable observation of typed user names and passwords from safe and inconspicuous distances. Key loggers may also be installed nefariously to capture keys typed by a user. Therefore, improved methods of protecting this information are desired.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

As discussed above, username and/or password information may be obtained in nefarious ways, leading to compromised computer data. The disclosed embodiments solve this technical problem by providing a configurable method of ignoring certain characters typed as part of computer account credentials. These may include usernames and/or passwords. For example, as discussed in more detail below, some of the disclosed embodiments provide for configuration of an ignore profile for a computer account. The ignore profile defines a method for determining which characters in an entered password are to be ignored. For example, an account may be configured such that characters entered between a first position within a password and a second position within the password are ignored. Alternatively, the ignore profile may define a sequence of characters that signals the beginning of characters that should be ignored, and a second sequence of characters that signal when characters should stop being ignored. In some aspects, these sequences are configured by specifying a regular expression, such as regular expression defined by Boost.Regex, Glib, Greta, Helios RXPF, ICU, Jakarta/Regexp, PCRE, Qt, or another regular expression library. A regular expression generally can be described as a text string for describing a search pattern.

The ignore profiles may also be applied based on a date and/or location. Thus, for example, a business traveler may apply a first ignore profile when traveling on business, and a second ignore profile when located within a proximity to their home or place of work. Another ignore profile may be applied on Fridays, but not on Tuesdays. By selectively ignoring portions of an entered password, inappropriate appropriation of authentication information can be made more difficult, and thus reduced.

The present disclosure thus provides a technical solution to the technical problem of compromised authentication credentials by introducing additional entropy or variability into the passwords that may be hard to guess and/or reproduce even when at least one instance of a user's password has been obtained.

Figure 1:
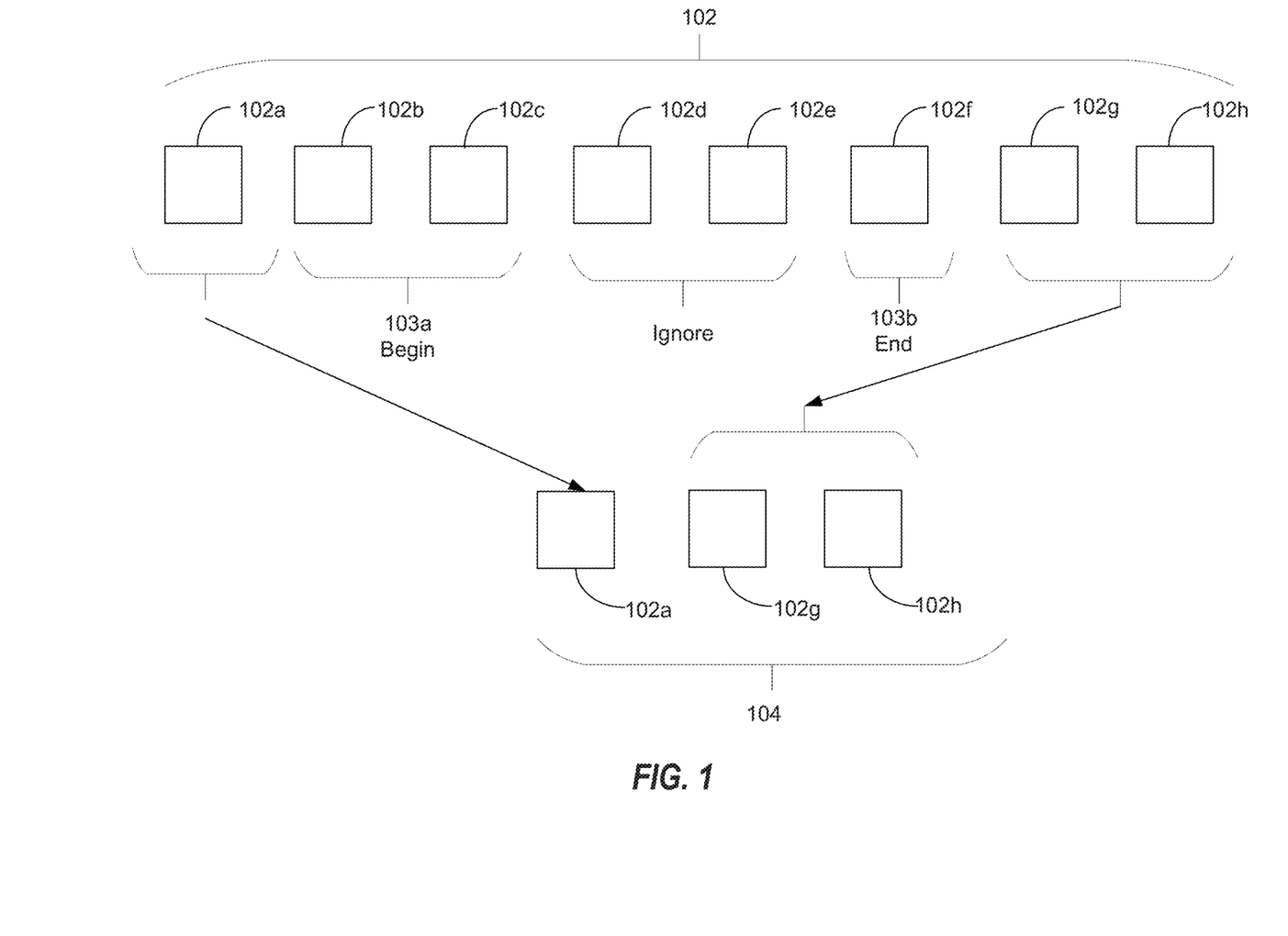
FIG. 1 is an overview diagram showing that some characters included an entered password may be ignored to form a second password.

FIG. 1 is an overview diagram showing that some characters included an entered password may be ignored to form a second password. FIG. 1 shows a sequence of characters 102 including characters 102a-h. The characters 102a-h may be entered at a keyboard by a user. The sequence of characters 102 may include a beginning sequence 103a and an ending sequence 103b. The beginning sequence may signal a start of characters that are to be ignored from the sequence 102. The ending sequence 103b may signal an end of characters that are to be ignored from the sequence 102. Characters between the beginning sequence 103a and ending sequence 103b are ignored and not included in the second password 104. In some embodiments, the beginning sequence 103a and ending sequence 103b may also be ignored and not included in the second password 104. In some other embodiments, the beginning sequence 103a and ending sequence 103 may be included in the second password 104. The second password 104 may then be used to authenticate a user account.

Figure 2:
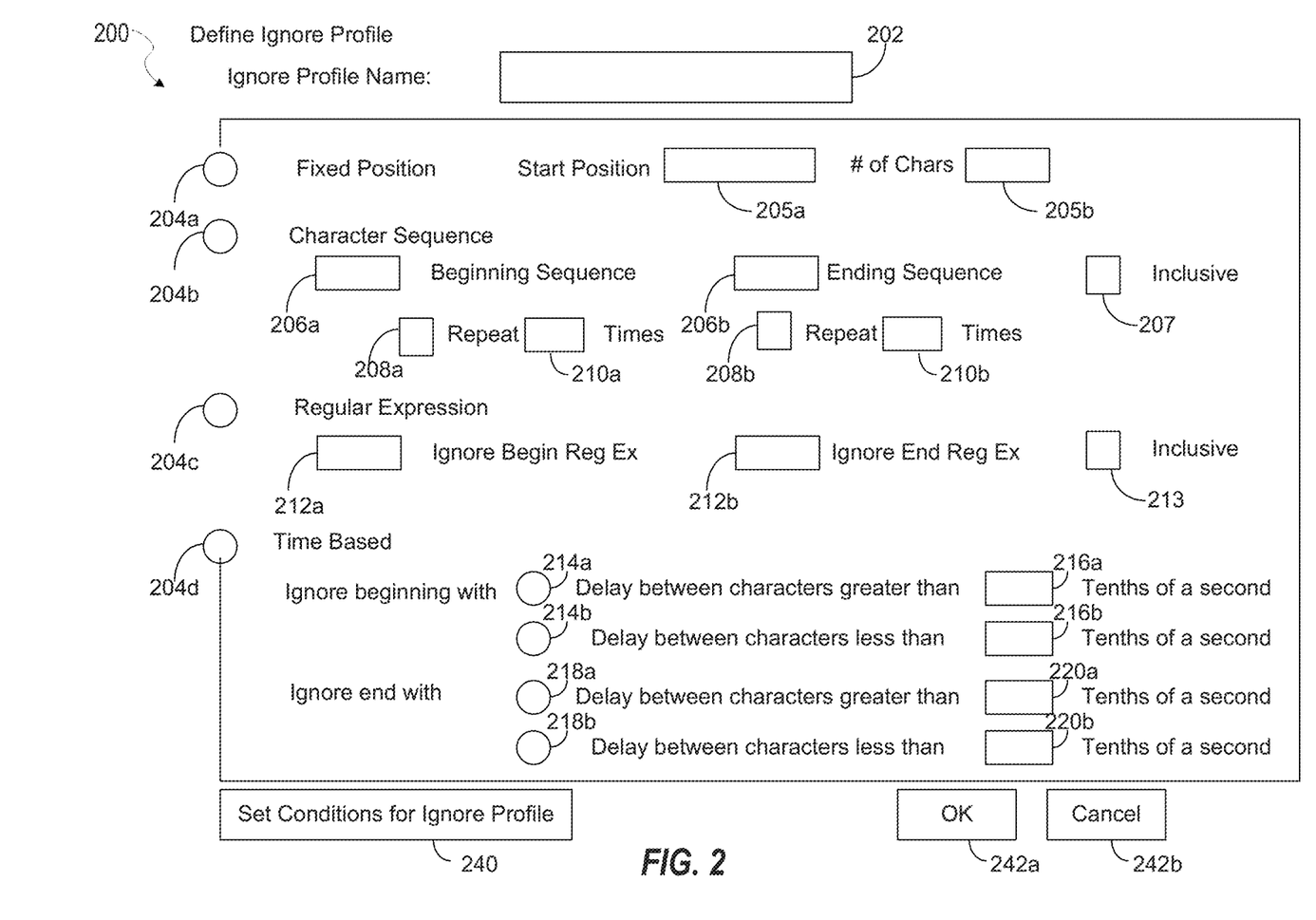
FIG. 2 shows an example user interface 200 including fields, one or more of which may be implemented in at least some of the disclosed embodiments.

FIG. 2 shows an example user interface 200 including fields, one or more of which may be implemented in at least some of the disclosed embodiments. The user interface 200 includes an edit field 202 for naming an ignore profile. An ignore profile defines how one or more characters of a password entered by a user may be ignored to create a second password, with the second password used to authenticate a user account.

The user interface 200 provides four radio buttons 204a-d, each radio button defining a different method of ignoring characters in a password entered by a user. A first method applied when the radio button 204a is selected defines a fixed position to begin ignoring characters. A count 205b of the number of characters to ignore is also included. Other embodiments may receive a second fixed position to end ignoring of characters instead of the count 205b.

A second method is applied when radio button 204b is selected. The second method includes a beginning sequence 206a of characters and an ending sequence of characters 206b. When the second method is selected, characters entered by a user between the beginning sequence 206a and ending sequence 206b may be ignored, such as characters 102d and 102e of FIG. 1. The user interface 200 is also configured to receive input defining whether the beginning sequence 206a and ending sequence 206b must repeat via check box 208a and 208b respectively. The user interface 200 is configured to accept input defining a repeat count 210a for the beginning sequence 206a and 210b for the ending sequence 206b.

A third method of ignoring characters entered by a user is selected via radio button 204b. With this method, the user may define a first regular expression 212a for the beginning sequence and a second regular expression 212b for an ending sequence. The user interface 200 is also configured to accept input defining whether the sequences defined by regular expressions are inclusive to the ignored characters or exclusive to the ignored characters via inclusive check box 213.

A fourth method of ignoring characters may be selected via radio button 204c. The third method ignores characters based on an amount of time between the characters. When selecting radio button 204c, user interface 200 is configured to accept input defining a time delay between characters that starts ignoring characters (via either 216a or 216b) and a time delay that ends ignoring characters (via either 220a or 220b). The user may select time delays greater than or less than the specified time, via radio buttons 214a-b, to select a begin sequence time criterion, and radio buttons 214c-d to select an end sequence time criterion.

The disclosed embodiments may provide ignore profiles such as those configured via interface 200 that are applied conditionally based on at least one or more of time, date, or location. To set these conditions, a user may select button 240. An ok button 242a accepts the ignore profile defined by the fields of user interface 200 and a cancel button 242b ignores any data entered in the user interface 200.

Figure 3:
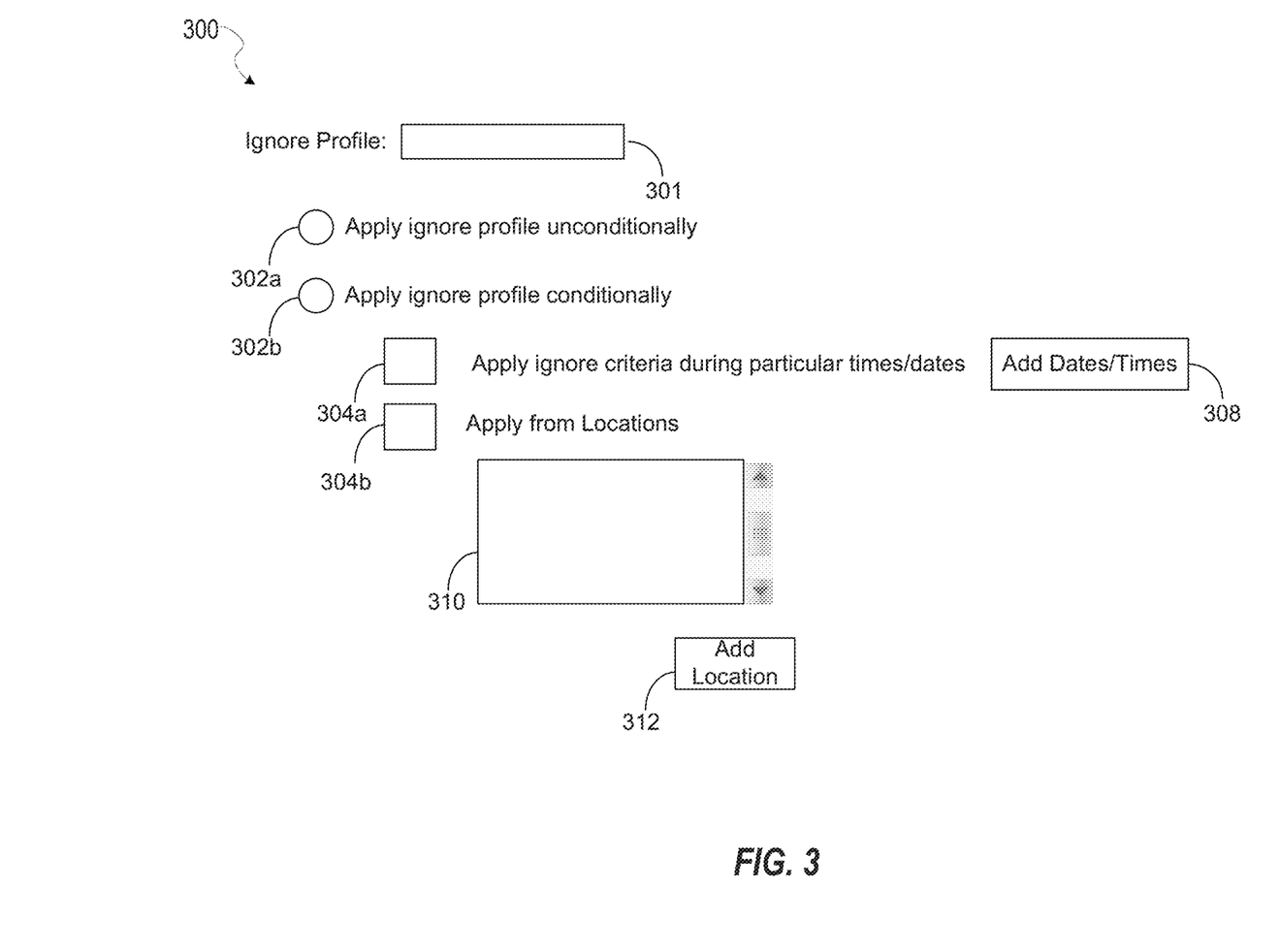
FIG. 3 shows a user interface that provides for definition of conditions for applying an ignore profile.

FIG. 3 shows a user interface that provides for definition of conditions for applying an ignore profile. In some aspects, the user interface 300 may be launched via selection of the button 242a of user interface 200.

The user interface 300 includes radio buttons 302a-b. Selecting radio button 302a applies the ignore profile unconditionally. Selecting radio button 302b causes the ignore profile identified by 301 to be applied according to time and or location conditions. Time conditions may be applied to the ignore profile when checkbox 304a is selected, while location conditions may be applied to the ignore profile when checkbox 304b is selected. The time conditions may be defined via button 308. Location conditions may be defined via button 312. List box 310 displays location condition information for this ignore profile (e.g. 301).

Figure 4:
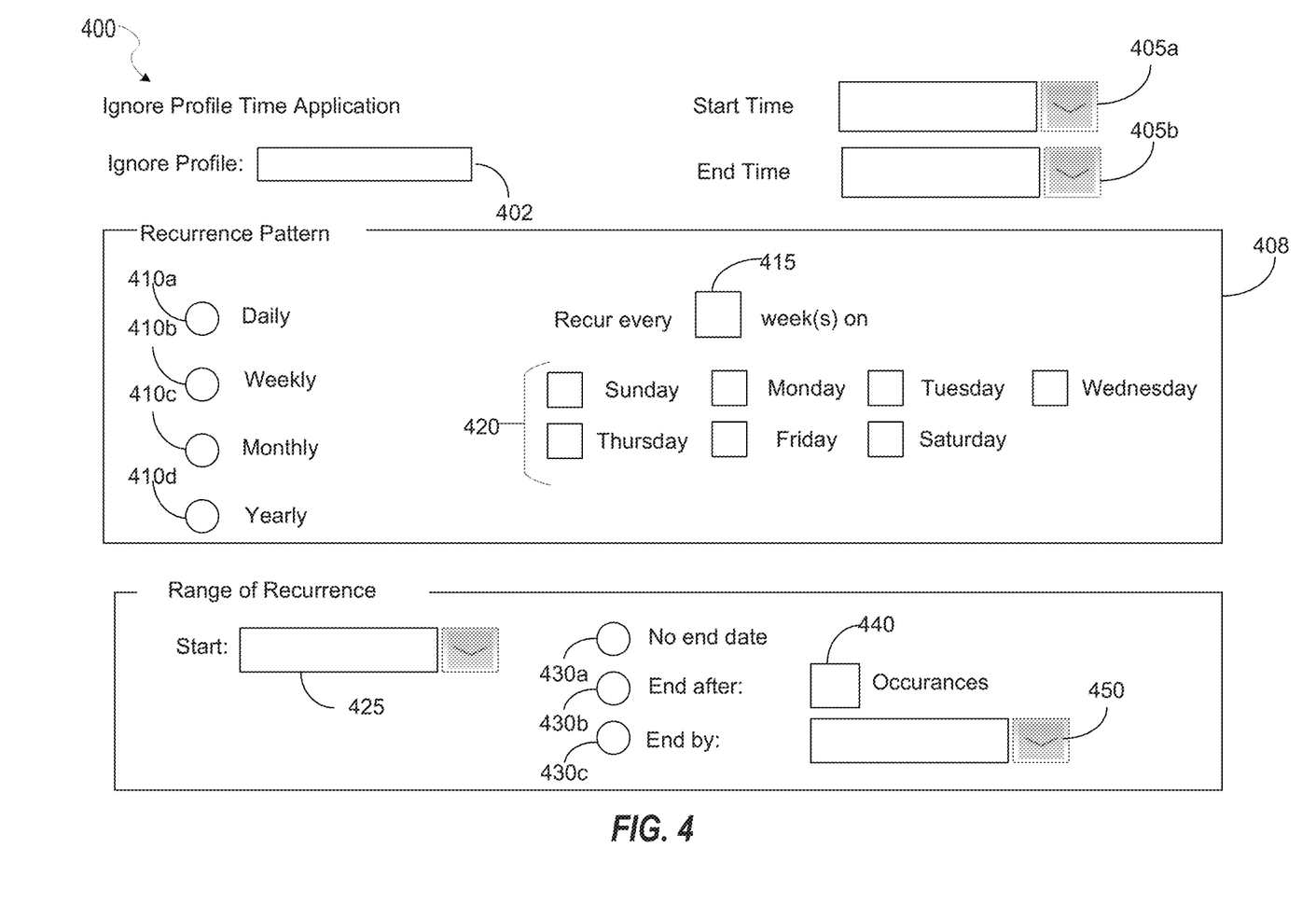
FIG. 4 shows an example user interface that may define time criterion for applying an ignore profile.

FIG. 4 shows an example user interface that may define time criterion for applying an ignore profile. In some aspects, the user interface 400 may be displayed in response to the button 308 of user interface 300.

The user interface 400 is configured to accept input defining a start time 405a and end time 405b to apply the ignore profile identified as 402. User interface 400 also is configured to accept input defining a recurrence pattern 408 for application of the ignore profile (e.g. 402). The recurrence pattern 408 may be defined as weekly (via radio button 410a), weekly (via radio button 410b), monthly (via radio button 410c), or yearly (via radio button 410d). The recurrence pattern 408 may also be defined to recur a particular number 415 of weeks, and/or to recur on selected days of the week via checkboxes 420.

The recurrence of application of the ignore profile (e.g. 402) may be defined to start on a particular date (via 425), and have no end date (via radio button 430a), end after a particular number of occurrences (defined by 440), or end by a particular date (defined by 450).

Figure 5:
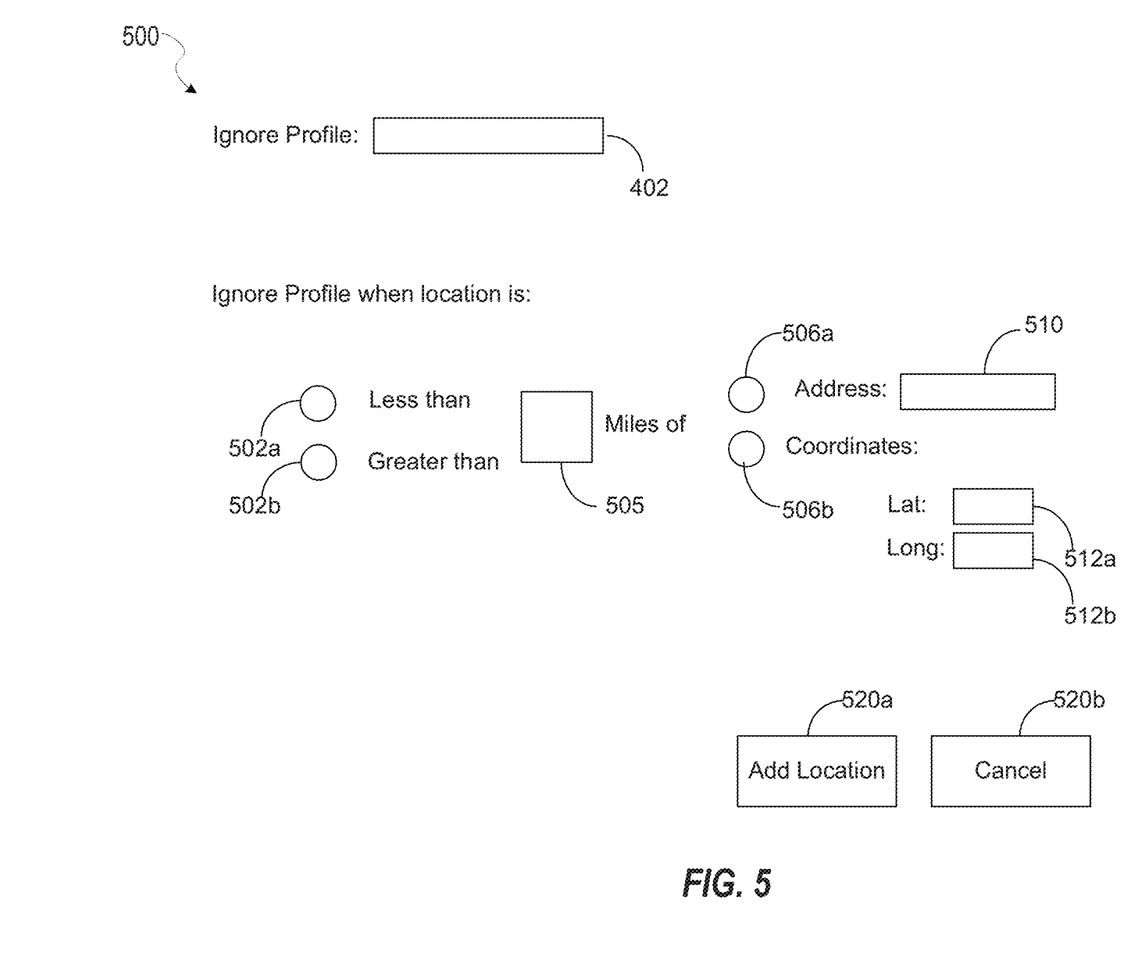
FIG. 5 shows a user interface for defining location criterion for an ignore profile.

FIG. 5 shows a user interface for defining location criterion for an ignore profile. The user interface 500 is defining location criterion for an ignore profile identified by the box 502. The location criterion defined by user interface 500 may be greater than or less than a distance from a particular geographic location. Selecting one of radio buttons 502a (less than) or 502b (greater than) determines the nature of the criterion. The user interface 500 is configured to accept input defining the distance via edit box 505. The geographic location may be specified via either an address by selecting radio button 506a and entering an address via list box 510 or coordinates by selecting radio button 506b and entering a latitude via edit box 512a and longitude via edit box 512b. Button 520a adds the location to the list box 310 while cancel button 522b exits user interface 500 without saving any information provided.

Figure 6:
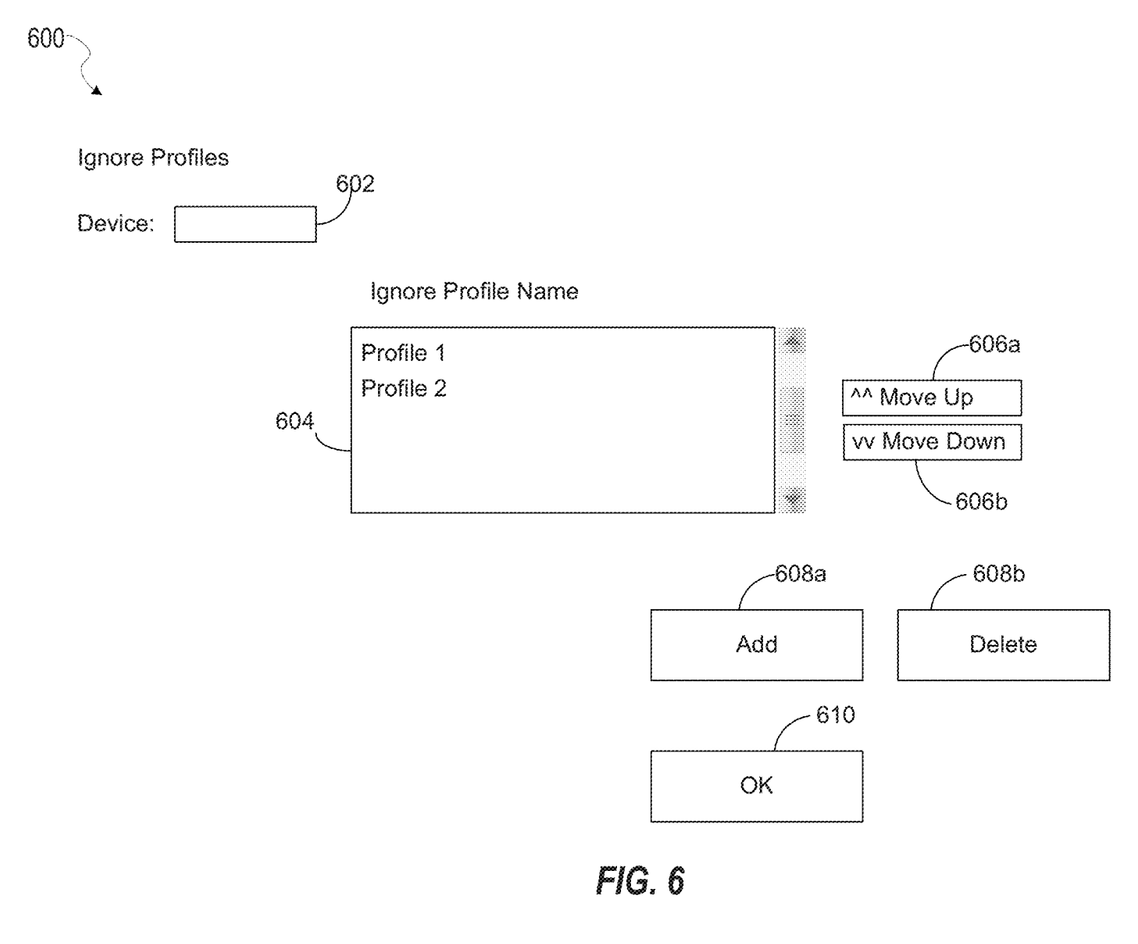
FIG. 6 shows an example user interface that may be implemented in at least some of the disclosed embodiments.

FIG. 6 shows an example user interface that may be implemented in at least some of the disclosed embodiments. The user interface 600 of FIG. 6 provides for the creation and deletion of ignore profiles. A list of ignore profiles may be created for a device by selecting a radio button 601a and providing a device name or address in the edit box 602a. A list of ignore profiles for a user may be created by selecting a radio button 601b and providing a user name in the edit box 602b. The ignore profiles for the selected device or username are listed in the list box 604. As application of various ignore profiles listed in the list box 604 may conflict in some time periods or locations, the ignore profiles are applied in an order defined by the list box. Some implementations may search through the ignore profiles starting at a topmost ignore profile in the list box 604 until an ignore profile is found that has application criterion that are met. That ignore profile is then applied, with any ignore profiles lower in the list box 604 not applied. The order of the ignore profiles in the list box 604 may be configured via the up and down buttons 606a-b. Button 608a may provide for a new ignore profile, for example, by launching the user interface 200. Button 608b may delete an ignore profile highlighted in the list box 604. The ok button 610 exits the user interface 600.

In some aspects, the ignore profiles displayed by user interface 600 may be synchronized between client and server devices to provide for authentication of the client by the server. For example, the user interfaces of FIGS. 2-6 may be displayed on a client device and data defined locally to the client device. This data may then be synchronized with a server, with the server actually performing the ignore operations before comparing a resulting password to authentication credentials stored at the server. Alternatively, the client may perform the ignore functions defined by the data and the resulting password sent to the server. In these embodiments, the server is unaware of any ignore operations occurring.

Figure 7:
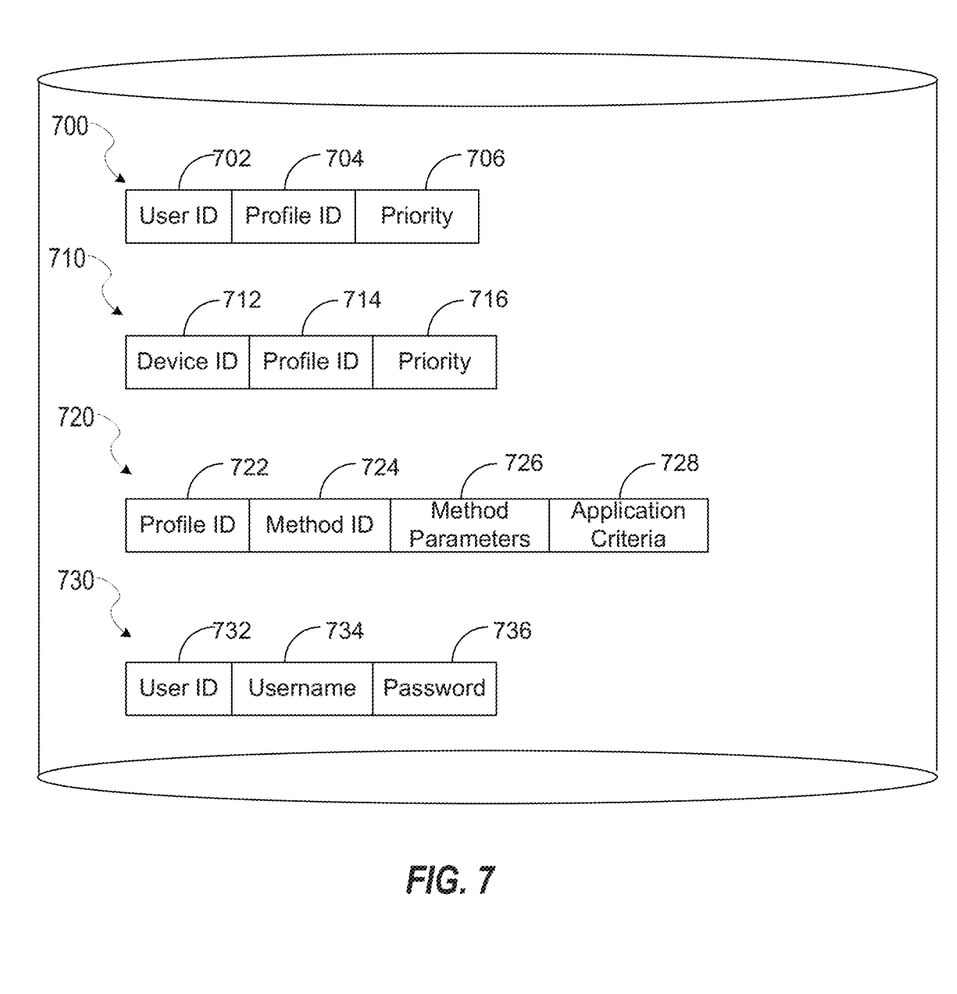
FIG. 7 shows a user profile table, device profile table, profile table, and a user table.

FIG. 7 shows example data structures, one or more of which that may be maintained by one or more of the disclosed embodiments. The data structures discussed below with respect to FIG. 7 may be implemented, in some aspects, as rows in relational database tables. In other embodiments, the data structures may be memory data structures stored in a volatile or non-volatile memory.

FIG. 7 shows a user profile table 700, device profile table 710, profile table 720, and a user table 730. The user profile table 700 includes a user identifier 702, profile identifier 704, and a priority 706. The user identifier 702 uniquely identifies a particular user. The profile identifier 704 uniquely identifies a particular ignore profile. The priority 706 defines a priority of evaluation of the ignore profile identified by the profile identifier 704 (for example, as defined by an order of the profile in the list box 604 discussed above).

The device profile includes a device identifier 712, profile identifier 714, and a priority 716. The device identifier 712 uniquely identifies a device. The device identifier 712 may be, in various aspects, a station address, UUID, or IP address of a device. The profile identifier 714 uniquely identifies an ignore profile. The priority 716 defines a priority of evaluation of the ignore profile identified by the profile identifier 714 (for example, as defined by an order of the profile in the list box 604 discussed above).

The ignore profile table 720 includes a profile identifier 722, method identifier 724, method parameters 726, and application criterion 728. The profile identifier 722 uniquely identifies an ignore profile. The method identifier 724 identifies whether the ignore profile ignores characters based on a beginning and ending sequence (e.g. via control 204a), regular expressions (e.g., via control 204b), or via timing thresholds (e.g. via control 204c). The method parameters field 726 define parameters to control the method identified in the method id field 724. For example, the method parameters field may store one or more of the fields displayed on user interface 200. The application criteria field 728 stores data defining criterion for application of the profile identified by profile id 722. The application criteria may store data indicating any one or more of the fields described with respect to FIGS. 3-5.

The user table 730 includes a user identifier 732, username 734 and password 736. The user table 730 may define authentication information for users of a system implementing the disclosed embodiments. The user identifier 732 may be cross referenced with user identifier 702. The username field 734 defines a user account name, and the password 736 defines a password for the account identified by the user account identified via username 734. The password 736 may be compared to a password resulting from application of an ignore profile, as described above.

Figure 8:
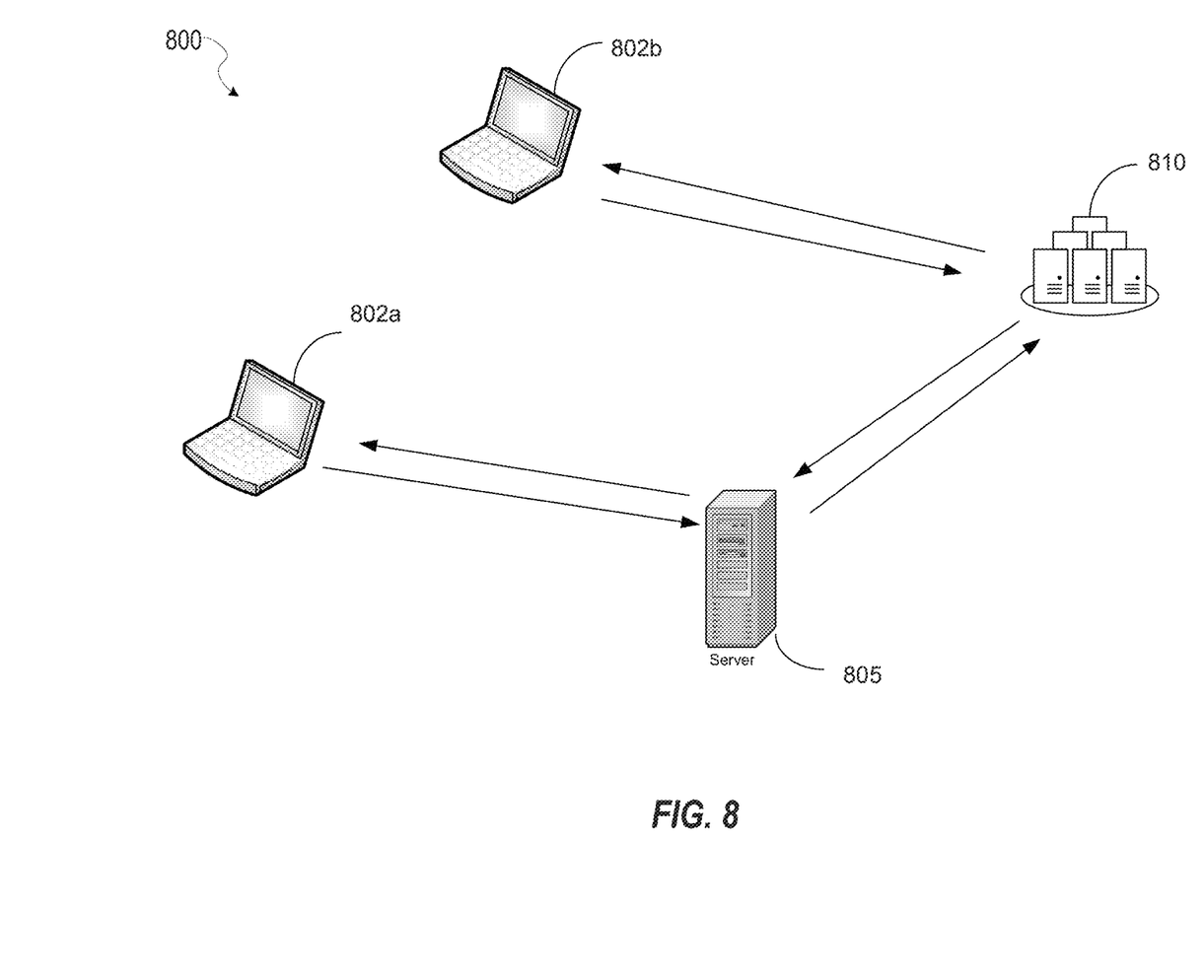
FIG. 8 is an overview diagram of a computer system that implements one or more of the disclosed embodiments.

FIG. 8 is an overview diagram of a computer system that implements one or more of the disclosed embodiments. FIG. 8 shows computing devices 802a and 802b, a server 805, and a cloud computing implementation 810. The cloud computing implementation 810 may host an authentication service. The authentication service may compare authentication credentials provided by one or more of the computing device 802b and/or server 805 with credentials stored in an authentication database (e.g. 730). If the credentials match, the cloud computing implementation 810 may establish a session for the user account with the device submitting the authentication credentials.

The embodiments disclosed herein may be implemented by one or more of the computing device 802b and/or server 805. For example, in some aspects, the ignore profiles discussed above may be configured on, and operate within, a single device, such as the computing device 802b.

In some other aspects, the disclosed embodiments may be implemented on the server device 805. In these embodiments, a password may be entered at the client device 802a. The entered password may then be provided to the server device 805 via a network. The server device 805 may then apply an ignore profile to the received entered password to generate a second password, which the server device 805 then provides to the authentication service implemented by the cloud computing implementation 810. In these aspects, the ignore profile may be configured separately on each of the client device 802a and the server device 805. In other embodiments, the ignore profile may only be configurable via the server 805 and may be distributed to the client device(s) 802a-b.

In some aspects implementing ignore profiles on the server 805, a password entered on a client device (e.g. 802a) may need to be transmitted in its original form to the server 805. To prevent complete entered passwords from being transmitted over a network, the complete entered password may be encrypted before being sent to the server. For example, the client could encrypt the password with a public key of the server 805, which is then decrypted using the server's private key. An ignore profile could then be applied by the server to the decrypted complete entered password.

While the example embodiment shown in FIG. 8 and discussed above is described as hosting the authentication service on the describes the authentication service running on the cloud computing implementation 810, in other embodiments, the authentication service could run on any of the client devices 802a or 802b, or the server 805.

Figure 9:
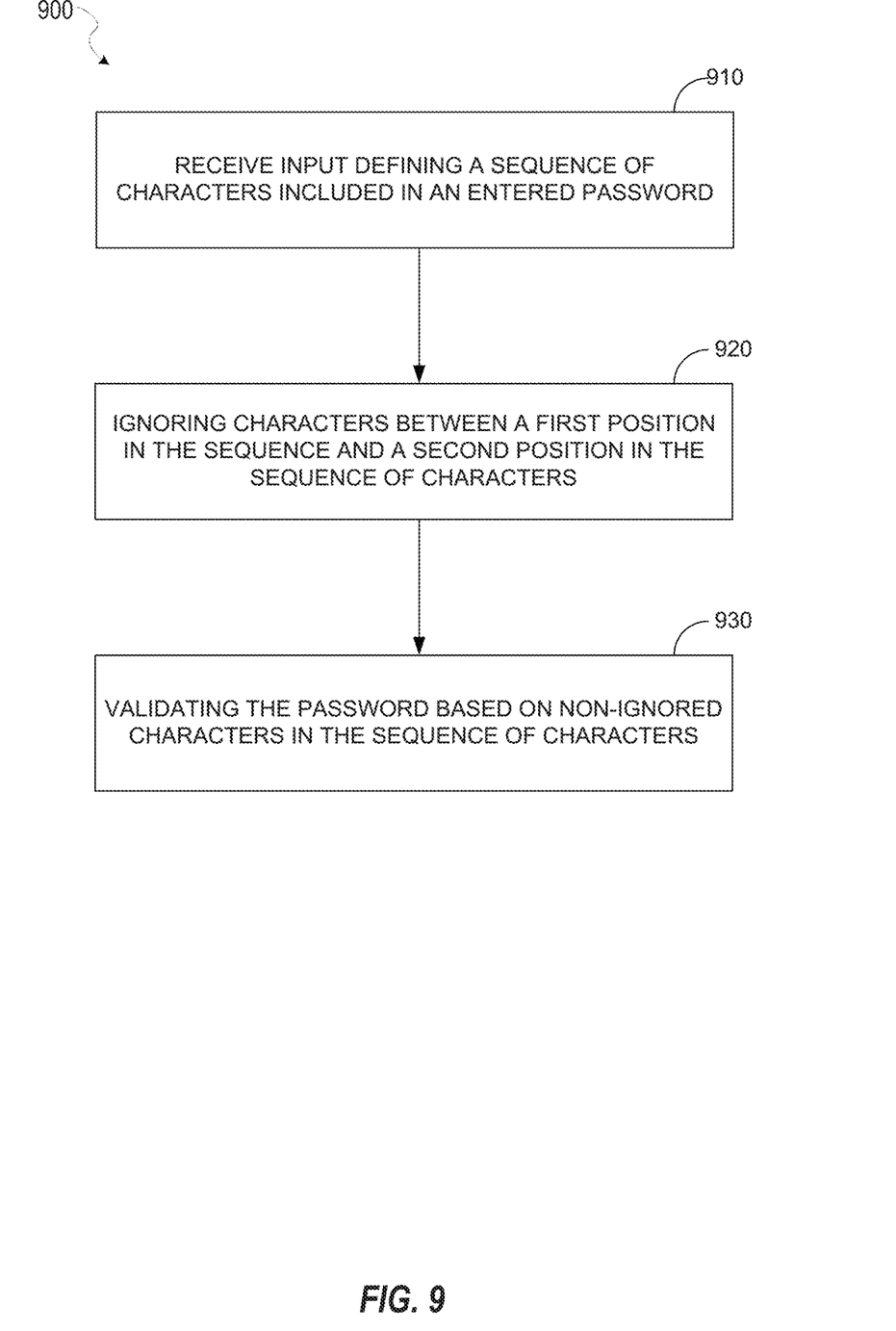
FIG. 9 is a flowchart of a method for validating a password.

FIG. 9 is a flowchart of a method for validating a password. In some aspects, one or more of the functions discussed below with respect to FIG. 9 may be performed by hardware processing circuitry. For example, instructions stored in an electronic memory may configure the hardware processing circuitry to perform one or more of the functions discussed below with respect to FIG. 9.

In operation 910, input is received defining a sequence of characters included in an entered password. The characters may include any characters that could be included in a password. The characters may be encoded as ascii characters or Unicode characters, or any other character format. In some aspects, the characters may have been manually typed by a user into a "log in" user interface accepting a password field. In other aspects, the characters may be included in a script or entered programmatically via a login API. In some aspects, the input is received over a network from a client device. In other aspects, the input may be received from a first component of a single device by a second component of the single device.

In operation 920, characters between a first position in the sequence and a second portion in the sequence are ignored. As discussed above with respect to FIG. 1, in some aspects, a second password may be generated based on the sequence of characters received in option 910. The second password may include a subset of the characters of the entered password, with the characters of the entered password not included in the second password representing the "ignored" characters.

As discussed above, the first position and the second position are determined using a variety of techniques in various embodiments. For example, in some aspects, the first and second positions may be located at a first character position within the password. For example, as described above with respect to FIG. 2, in some embodiments, a start position may be configured (e.g., 205a) along with a number of characters to ignore (e.g. 205b). In some other aspects, an explicit end position with the string may be defined. In some other aspects, ignoring of characters may be based on detection of a first sequence of characters and a second (ending) sequence of characters. Characters between the first and second sequence of characters within the entered password are ignored in these embodiments. In various aspects, the beginning and ending sequences themselves may be ignored or not. For example, as shown in the user interface 200, the inclusive check boxes (e.g. 207 and/or 213) may be used to define whether the beginning and ending sequences themselves form part of the second password, or are ignored. In some aspects, the beginning sequence of characters and/or the ending sequence of characters may include repeating characters. In some aspects for example, user interface 200 defines a sequence of characters that needs to repeat a configurable (e.g. 208a or 208b) number of times to form the beginning sequence and/or the ending sequence.

In some aspects, the first and second sequences may be defined via regular expressions. As discussed above with respect to FIG. 2, in some aspects, a user interface control may be selected (e.g. 204c), and regular expressions defining the beginning sequence (e.g. 212a) and/or ending sequence (e.g. 212b) may be received in the user interface 200. The provided regular expression(s) are then evaluated on the entered password to identify a position to begin ignoring characters and/or a second position to end ignoring characters.

As discussed above for example with respect to FIGS. 3-5, particular ignore profiles defining which characters in a password are to be ignored may be applied based on time/date and/or location criterion. For example, process 900 may identify one or more of a user and/or device on which the entered password was entered. A list of ignore profiles for the user and/or device may then be obtained, for example, as may be configured via list box 604 and stored via tables 700 and/or 710. Starting from the top of the list, process 900 may determine whether the first listed profile is to be applied given any date/time and/or location criterion that may be included in the ignore profile (e.g. 728 of 720). If the first ignore profile in the list does not apply because one or more of these criterion are not met, a second ignore profile is analyzed to determine if it should apply given time/date and location of the device/user.

In operation 930, the second password is validated. Validating the password may include passing the second password, along with a user account name in some embodiments, to an authentication API. The authentication API may establish a user session if the provided password and user account name match a preexisting account on a system.

Some aspects of process 900 may enforce an amount of difference between characters ignored in a first password and those ignored in a second password for the same user account. For example, process 900 may store the ignored portion of the entered password, and receive second input defining a second sequence of characters included in a second entered password. Process 900 may then apply the appropriate ignore profile to ignore second characters of the second sequence of characters. A similarity between the stored ignored portion of the first entered password and the second characters ignored in the second entered password may be determined. The validation of the second entered password may fail if the similarity between the first and second sets of ignored characters are too similar, in that a similarity score meets one or more criterion. If the similarity score meets a second one or more criterion, the validation may succeed. In some aspects, if the similarity score (e.g. edit distance) is below a threshold, the validation fails. In some aspects, a Levenshtein distance may be used.

Some embodiments may determine whether the positions of ignored characters across multiple passwords are too similar. For example, some aspects may store the first and/or second positions determined in operation 920. Second input is then received defining a second sequence of characters included in a second entered password. A third position in the second sequence of characters is determined. For example, the third position may be determined based on one or more parameters entered via a user interface such as user interface 200, as discussed above. Characters in the second sequence of characters are then ignored based on the third position. Note that a fourth position within the second password may also be determined, with the fourth position defining where to stop ignoring characters. In some aspects, the fourth position may be defined as described above with respect to user interface 200. The first and third positions may be compared, and failing the validation of the second entered password if the first and third positions are equivalent. In other words, these aspects may enforce that positions of ignored characters within an entered password must be different across multiple logins or login attempts.

Figure 10:
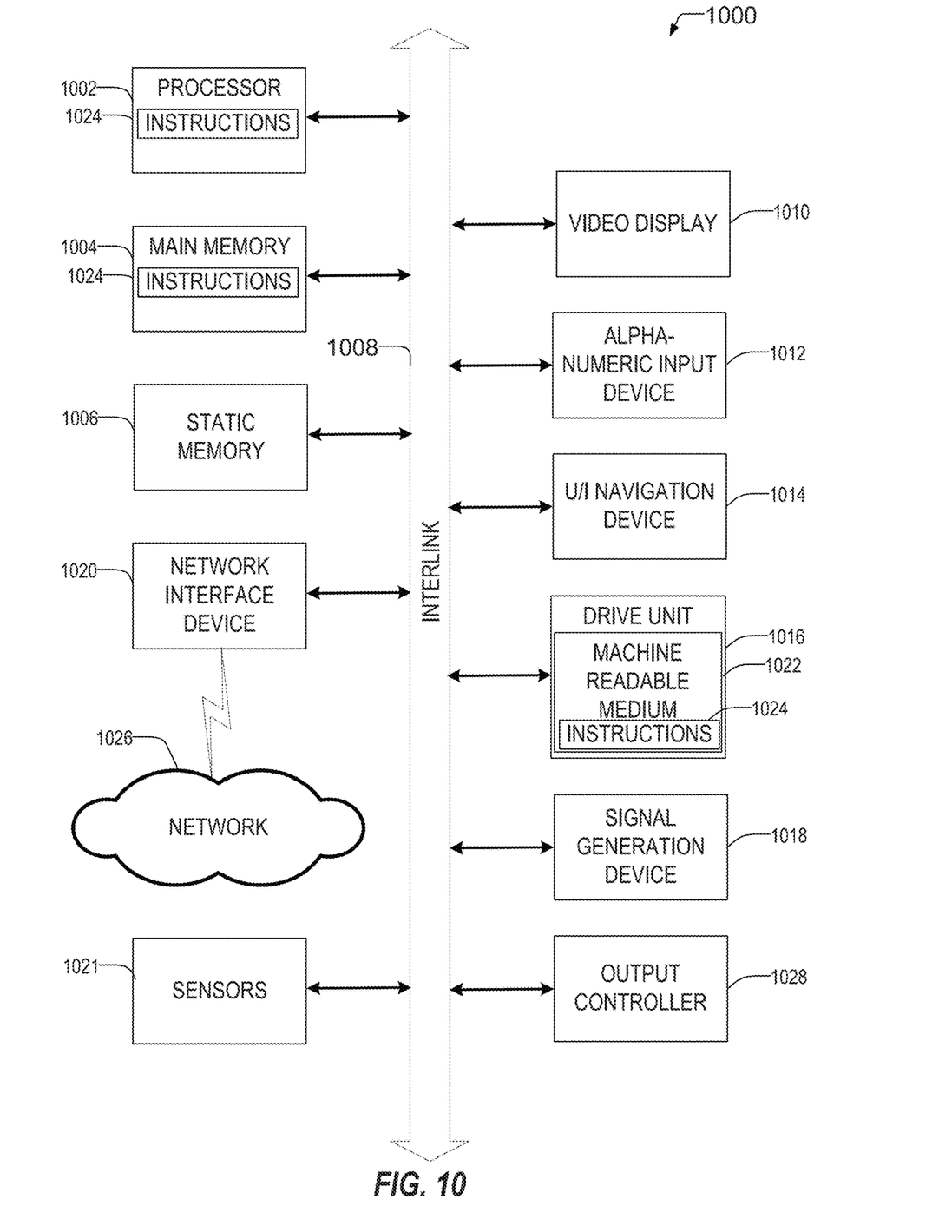
FIG. 10 illustrates a block diagram of an example machine upon which any one or more of the techniques (e.g., methodologies) discussed herein may perform.

FIG. 10 illustrates a block diagram of an example machine 1000 upon which any one or more of the techniques (e.g., methodologies) discussed herein may perform. In alternative embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in peer-to-peer (P2P) (or other distributed) network environment. The machine 1000 may be a personal computer (PC), a tablet PC, a set-top box (STB), a personal digital assistant (PDA), a mobile telephone, a smart phone, a web appliance, a network router, switch or bridge, a server computer, a database, conference room equipment, or any machine capable of executing instructions (sequential or otherwise) that specify actions to be taken by that machine. In various embodiments, machine 1000 may perform one or more of the processes described above with respect to FIGS. 1-9. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms (all referred to hereinafter as "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 1000 may include a hardware processor 1002 (e.g., a central processing unit (CPU), a graphics processing unit (GPU), a hardware processor core, or any combination thereof), a main memory 1004 and a static memory 1006, some or all of which may communicate with each other via an interlink (e.g., bus) 1008. The machine 1000 may further include a display unit 1010, an alphanumeric input device 1012 (e.g., a keyboard), and a user interface (UI) navigation device 1014 (e.g., a mouse). In an example, the display unit 1010, input device 1012 and UI navigation device 1014 may be a touch screen display. The machine 1000 may additionally include a storage device (e.g., drive unit) 1016, a signal generation device 1018 (e.g., a speaker), a network interface device 1020, and one or more sensors 1021, such as a global positioning system (GPS) sensor, compass, accelerometer, or other sensor. The machine 1000 may include an output controller 1028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1016 may include a machine readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within static memory 1006, or within the hardware processor 1002 during execution thereof by the machine 1000. In an example, one or any combination of the hardware processor 1002, the main memory 1004, the static memory 1006, or the storage device 1016 may constitute machine readable media.

While the machine readable medium 1022 is illustrated as a single medium, the term "machine readable medium" may include a single medium or multiple media (e.g., a centralized or distributed database, and/or associated caches and servers) configured to store the one or more instructions 1024.

The term "machine readable medium" may include any medium that is capable of storing, encoding, or carrying instructions for execution by the machine 1000 and that cause the machine 1000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 1024 may further be transmitted or received over a communications network 1026 using a transmission medium via the network interface device 1020. The machine 1000 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1020 may include one or more physical jacks (e.g., Ethernet, coaxial, or phone jacks) or one or more antennas to connect to the communications network 1026. In an example, the network interface device 1020 may include a plurality of antennas to wirelessly communicate using at least one of single-input multiple-output (SIMO), multiple-input multiple-output (MIMO), or multiple-input single-output (MISO) techniques. In some examples, the network interface device 1020 may wirelessly communicate using Multiple User MIMO techniques.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client, or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Example 1 is an apparatus for validating a password, comprising: hardware processing circuitry; a hardware memory storing instructions that when executed configure the hardware processing circuitry to perform operations comprising: receiving input defining a sequence of characters included in an entered password; ignoring characters between a first position in the sequence of characters and a second position in the sequence of characters; and validating the password based on non-ignored characters in the sequence of characters.

In Example 2, the subject matter of Example 1 optionally includes wherein the first position and the second position are static positions defined by configuration data.

In Example 3, the subject matter of any one or more of Examples 1-2 optionally include the operations further comprising identifying the first position based on at least two repeating characters in the sequence of characters.

In Example 4, the subject matter of any one or more of Examples 1-3 optionally include the operations further comprising determining the first position based on a date or a time of day.

In Example 5, the subject matter of any one or more of Examples 1-4 optionally include the operations further comprising obtaining a location of the device, and determining the first position based on the location.

In Example 6, the subject matter of any one or more of Examples 1-5 optionally include the operations further comprising evaluating a regular expression on the sequence of characters to identify the first position.

In Example 7, the subject matter of Example 6 optionally includes the operations further comprising evaluating a second regular expression on the sequence of characters to identify the second position.

In Example 8, the subject matter of any one or more of Examples 1-7 optionally include the operations further comprising: storing the ignored characters, receiving second input from the device defining a second sequence of characters included in a second password; ignoring second characters of the second sequence of characters; determining a similarity between the stored ignored characters and the second characters; and failing a validation of the second password in response to the similarity meeting a criterion.

In Example 9, the subject matter of any one or more of Examples 1-8 optionally include f the operations further comprising: storing the first position; receiving second input from the device defining a second sequence of characters included in a second password; determining a third position in the second sequence of characters; ignoring characters in the second sequence of characters based on the third position; comparing the first position to the third position; and failing a validation of the second password in response to the first and third positions being equivalent.

Example 10 is a method performed by a data processing system to validate a password, comprising: receiving input defining a sequence of characters included in an entered password; ignoring characters between a first position in the sequence of characters and a second position in the sequence of characters; and validating the password based on non-ignored characters in the sequence of characters.

In Example 11, the subject matter of Example 10 optionally includes wherein the first position and the second position are static positions defined by configuration data.

In Example 12, the subject matter of any one or more of Examples 10-11 optionally include identifying the first position based on at least two repeating characters in the sequence of characters.

In Example 13, the subject matter of any one or more of Examples 10-12 optionally include determining the first position based on a date or a time of day.

In Example 14, the subject matter of any one or more of Examples 10-13 optionally include obtaining a location of the device, and determining the first position based on the location.

In Example 15, the subject matter of any one or more of Examples 10-14 optionally include evaluating a regular expression on the sequence of characters to identify the first position.

In Example 16, the subject matter of Example 15 optionally includes evaluating a second regular expression on the sequence of characters to identify the second position.

In Example 17, the subject matter of any one or more of Examples 10-16 optionally include storing the ignored characters, receiving second input from the device defining a second sequence of characters included in a second password; ignoring second characters of the second sequence of characters; determining a similarity between the stored ignored characters and the second characters; and failing a validation of the second password in response to the similarity meeting a criterion.

In Example 18, the subject matter of any one or more of Examples 10-17 optionally include storing the first position, receiving second input from the device defining a second sequence of characters included in a second password; determining a third position in the second sequence of characters; ignoring characters in the second sequence of characters based on the third position; comparing the first position to the third position; and failing a validation of the second password in response to the first and third positions being equivalent.

Example 19 is an apparatus for validating a password, comprising: means for receiving input defining a sequence of characters included in an entered password; means for ignoring characters between a first position in the sequence of characters and a second position in the sequence of characters; and means for validating the password based on non-ignored characters in the sequence of characters.

In Example 20, the subject matter of Example 19 optionally includes means for identifying the first position based on at least two repeating characters in the sequence of characters.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory; etc.

We claim:

1. An apparatus for validating a password, comprising:
hardware processing circuitry;
a hardware memory storing instructions that when executed configure the hardware processing circuitry to perform operations comprising:
receiving input defining a sequence of characters for a first authentication attempt;
ignoring characters between a first position in the sequence of characters and a second position in the sequence of characters;
approving the first authentication attempt by validating that non-ignored characters in the sequence of characters matches a stored password;
receiving second input defining a second sequence of characters for a second authentication attempt;
ignoring characters between a third position in the second sequence of characters and a fourth position;
comparing the first position to the third position; and
failing the second authentication attempt in response to the first and third positions being equivalent.

2. The apparatus of claim 1, wherein the first position and the second position are static positions defined by configuration data.

3. The apparatus of claim 1, the operations further comprising identifying the first position based on at least two repeating characters in the sequence of characters.

4. The apparatus of claim 1, the operations further comprising determining the first position based on a date or a time of day.

5. The apparatus of claim 1, the operations further comprising obtaining a location of a user device, and determining the first position based on the location.

6. The apparatus of claim 1, the operations further comprising evaluating a regular expression on the sequence of characters to identify the first position.

7. The apparatus of claim 6, the operations further comprising evaluating a second regular expression on the sequence of characters to identify the second position.

8. A method performed by a data processing system to validate a password, comprising:
receiving input defining a sequence of characters for a first authentication attempt;
ignoring characters between a first position in the sequence of characters and a second position in the sequence of characters;
approving the first authentication attempt by validating that non-ignored characters in the sequence of characters matches a stored password;
receiving second input defining a second sequence of characters for a second authentication attempt;
ignoring characters between a third position in the second sequence of characters and a fourth position;
comparing the first position to the third position; and
failing the second authentication attempt in response to the first and third positions being equivalent.

9. The method of claim 8, wherein the first position and the second position are static positions defined by configuration data.

10. The method of claim 8, further comprising identifying the first position based on at least two repeating characters in the sequence of characters.

11. The method of claim 8, further comprising determining the first position based on a date or a time of day.

12. The method of claim 8, further comprising obtaining a location of a user device, and determining the first position based on the location.

13. The method of claim 8, further comprising evaluating a regular expression on the sequence of characters to identify the first position.

14. The method of claim 13, further comprising evaluating a second regular expression on the sequence of characters to identify the second position.

15. An apparatus for validating a password, comprising:
means for receiving input defining a sequence of characters for a first authentication attempt;
means for ignoring characters between a first position in the sequence of characters and a second position in the sequence of characters;
means for approving the first authentication attempt by validating that non-ignored characters in the sequence of characters matches a stored password;
means for receiving second input defining a second sequence of characters for a second authentication attempt;
means for ignoring characters between a third position in the second sequence of characters and a fourth position;
means for comparing the first position to the third position; and
means for failing the second authentication attempt in response to the first and third positions being equivalent.

16. The apparatus of claim 15, further comprising means for identifying the first position based on at least two repeating characters in the sequence of characters.

* * * * *